United States Patent [19]

Lundquist

[11] 4,083,263
[45] Apr. 11, 1978

[54] MOTORCYCLE GEAR SHIFTER

[76] Inventor: Charles W. Lundquist, 2003 Ernest Ave., Redondo Beach, Calif. 90278

[21] Appl. No.: 718,951

[22] Filed: Aug. 30, 1976

[51] Int. Cl.² ............................................. G05G 1/14
[52] U.S. Cl. ........................................ 74/474; 74/512;
74/531; 74/560; 74/594.6; 74/600
[58] Field of Search ................. 74/474, 512, 560, 531,
74/594.6, 600

[56] References Cited

U.S. PATENT DOCUMENTS

| 363,522 | 5/1887 | Knous | 74/600 X |
| 493,696 | 3/1893 | Ferguson | 74/594.6 |
| 787,565 | 4/1905 | Coryell | 74/531 X |
| 2,849,890 | 9/1958 | Reeser | 74/562.5 X |
| 3,919,896 | 11/1975 | Foster | 74/560 X |

FOREIGN PATENT DOCUMENTS 102,890  1/1924  Switzerland ................ 74/594.6

*Primary Examiner*—Allan D. Herrmann
*Attorney, Agent, or Firm*—William W. Haefliger

[57] ABSTRACT

An adjustable stirrup type motorcycle gear shifter allows the cyclist to slip his shoe into shifting position, either sidewardly or lengthwise, for safe retention during up and down gear shifting.

7 Claims, 5 Drawing Figures

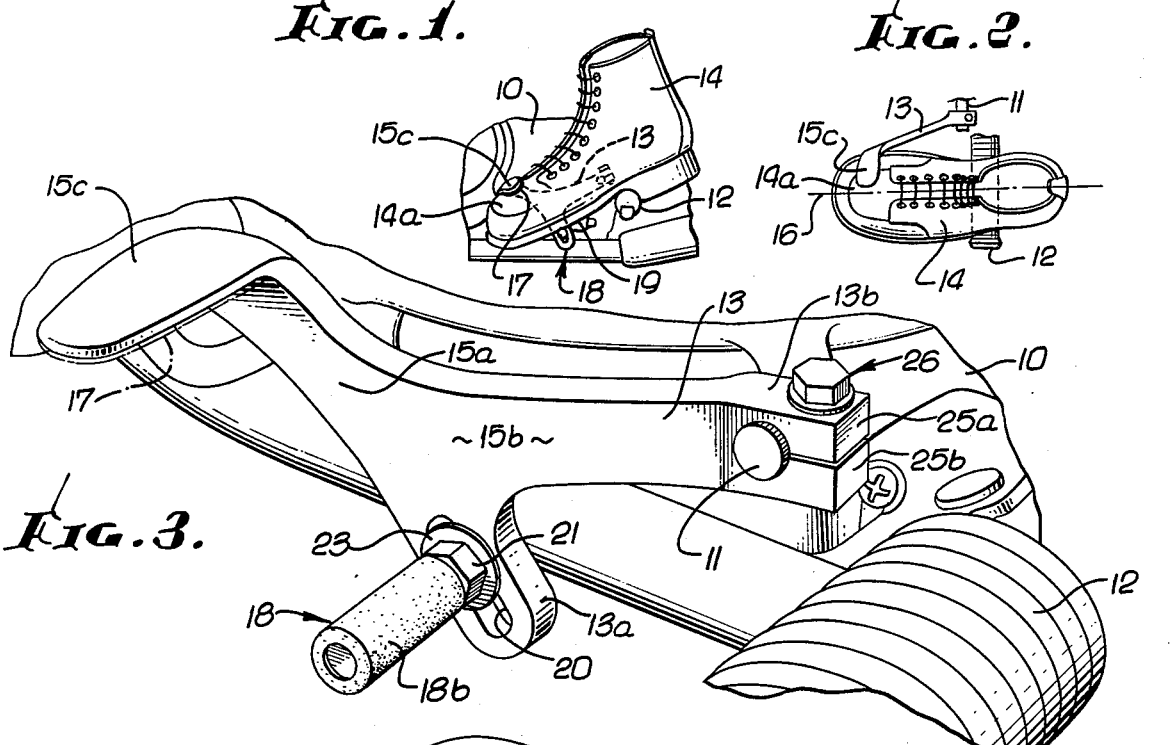
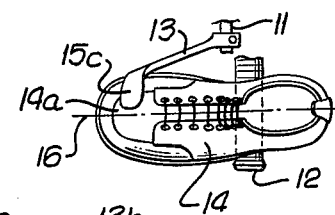
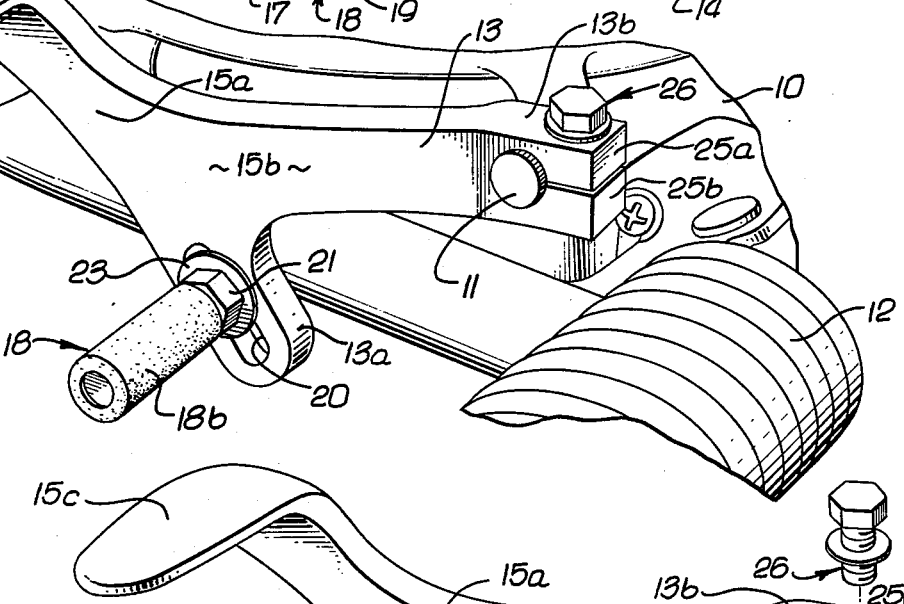
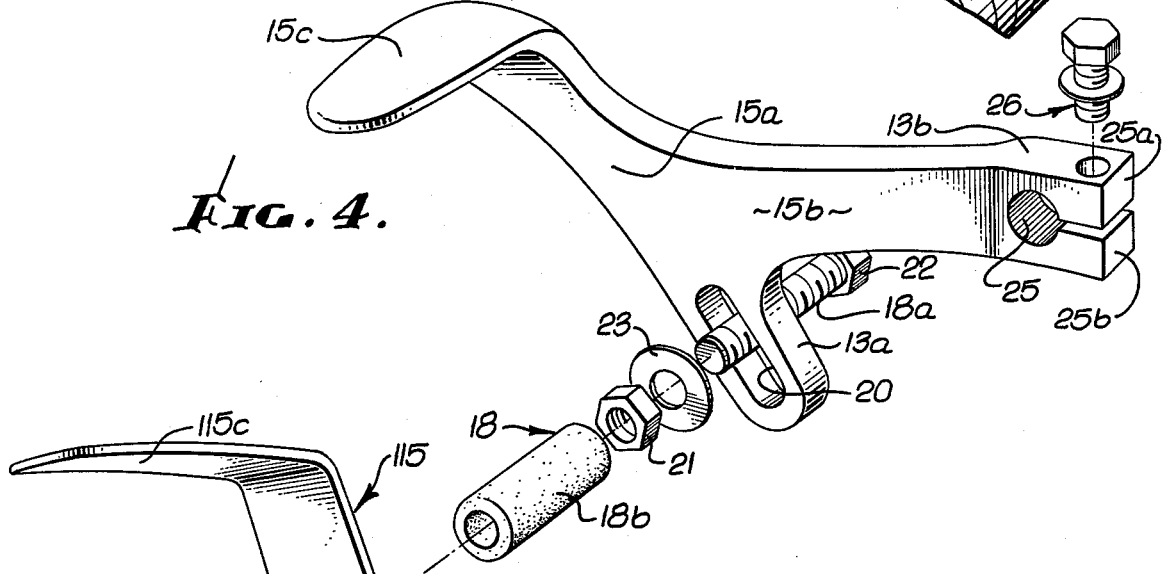
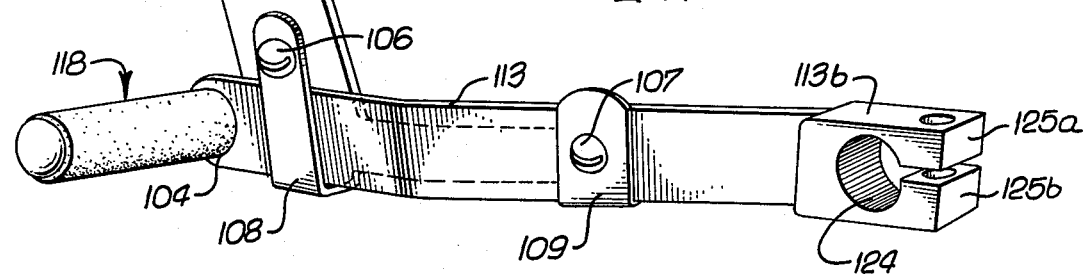

MOTORCYCLE GEAR SHIFTER

BACKGROUND OF THE INVENTION

This invention relates generally to motorcycle gear shifting, and more particularly concerns a stirrup type shifter which releasably and safely partially retains a cyclist's shoe.

In the past, the cyclist placed his shoe above or below a shifting peg on a crank arm, in order to urge the peg up or down for gear shifting. This required accurate sometimes rapid movement of the shoe; however, vibration and other causes could and did at times prevent accurate shoe movement for this purpose. There has been a need for a more easily usable shifting device which is also safe and does not snag the shoe.

SUMMARY OF THE INVENTION

It is a major object of the invention to provide a stirrup type device which allows shoe entry into retained position from either lateral or longitudinal directions, and facilitates both up and down shifting in a safe manner. Basically, the device of the invention is usable in combination with a gear shifting crank member adapted to extend lengthwise alongside the cyclist's shoe, and comprises:

(a) an L-shaped bracket having a first leg connected to the crank member and a second leg projecting to fit over and terminate above a portion of the shoe upper side proximate the toe region, and (b) a peg connected to said member and projecting to fit under and terminate beneath a portion of the shoe sole forwardly of the shoe heel, (c) whereby the motorcyclist's shoe is readily insertible between said second leg and peg and may then be displaced toward either the second leg or peg to rotate the crank member for effecting gear shifting.

As will appear, the bracket and crank member may be integral or releasably interconnected; the peg may have adjustable connection to the crank member to facilitate adjustment for different shoe sizes, and the bracket is designed to prevent snagging with a shoe or shoe laces. Accordingly, the cyclist's foot is retained in position for immediate shifting up or down, despite excessive vibration, and yet the shoe may easily be dislodged or freed in an emergency.

These and other objects and advantages of the invention, as well as the details of illustrative embodiments, will be more fully understood from the following description and drawings, in which:

DRAWING DESCRIPTION

FIG. 1 is a side elevation showing use of a shifter embodying the invention;

FIG. 2 is a top plan view of the FIG. 1 shifter;

FIG. 3 is an enlarged perspective showing of the shifter;

FIG. 4 is an exploded perspective view of the FIG. 1-3 shifter; and

FIG. 5 is a perspective view of a modified shifter embodying the invention.

DETAILED DESCRIPTION

In FIG. 3 a motorcycle transmission gear box is shown at 10 having a splined stub shaft 11 to operate the gearing within the gear box. Also shown is a foot peg 12 projecting sidewardly from relative to the box, and adapted to support the motorcyclist's shoe sole just forward of the heel.

The shifter shown in FIGS. 1-4 includes a crank member 13 adapted to extend lengthwise forwardly along side the cyclist's shoe, as for example the inner side of the shoe (i.e. right side of the left shoe 14 better seen in FIGS. 1 and 2). The shifter also includes an L-shaped bracket 15 having a first leg 15a connected to the crank member. In FIG. 4 the connection is shown as integral, in the region 15b. Leg 15a extends forwardly and upwardly from crank member 13 and is joined to a second bracket leg 15c which projects leftwardly to fit over the shoe upper portion 14a. Leg 15c also terminates over the shoe upper portion 14a, and preferably at a point spaced from a vertical plane 16 which bisects the shoe in a forward-rearward direction. Legs 15a and 15c have rounded or smooth edges and contours, and the underside of leg 15c may carry a non-metallic pad which engages the top of the shoe and prevents scuffing. Such a pad is indicated at 17 in FIG. 1.

The shifter also includes a peg 18 connected to the crank member 13 and projecting sidewardly to fit under and terminate beneath a portion 19 of the shoe sole forwardly of the heel. The peg may have releasable connection to the crank member characterized in that the peg may be adjustably shifted toward or away from the second leg 15c to decrease or increase the space which receives the shoe, thereby to adjust to different shoe sizes. As shown in FIG. 4, the crank member includes a downwardly projecting portion 13a defining a slot 20 elongated in the generally upright direction of separation of the peg 18 and leg 15c. The peg includes an extension, such as bolt 18a, projecting through the slot, and an elastomeric or rubber outer sleeve 18b fitting over the bolt shank. When the nut 21 is tightened on the threaded shank of the bolt and against the left face of projection 13a, the head 22 bears against the right face of projection 13a and retains the peg in position. A washer 23 may be used, as shown.

In use, the cylist slips his shoe laterally or longitudinally into position between the leg 15c and peg 18, and tilts the shoe up or down to shift gears, as required. His foot cannot slip off the shifter, as by vibration, due to retention in position; yet, safety is assured as he can easily slip his shoe laterally or longitudinally out from position and to complete freedom. Snagging is prevented due to the spade like size of the leg 15c, of greater dimension in a forward direction than the spaces between shoe laces.

The crank member hub 13b is typically bored and splined at 24 for reception of the stub shaft 11. A bolt 26 tightens the bifurcations 25a and 25b to hold the hub onto the shaft.

In FIG. 5 the modified crank member 113 releasably supports the L-shaped member 115; thus, leg 115a may include tabs 108 and 109 which fold around and connect to the crank member 113 as by fasteners 106 and 107. Peg 118 attaches to the crank member 113 at locus 104. The elements 113b, 124, 125a and 125b correspond to elements 13b, 24, 25a and 25b in FIG. 4. Second leg 115c corresponds to leg 15c.

The device or devices as described may alternately be configured for use with a right foot shoe.

I claim:

1. For combination with a gear shifting crank member adapted to extend lengthwise alongside a motorcyclist's shoe, said crank member extending forwardly, the combination comprising (a) an L-shaped bracket having a first leg connected to the crank member and a second leg projecting laterally to fit over and terminate above a portion of the shoe upper side proximate the toe region, the first leg merging arcuately and smoothly toward the second leg at a junction which is concave toward the shoe, the crank and legs being one-piece, the underside of the second leg being substantially flat to conform to the normally flat upper side of a shoe top portion, (b) a peg connected to said member and projecting laterally to fit under and terminate beneath a portion of the shoe sole forwardly of the shoe heel, the lateral length of the second leg being substantially less than the width of the shoe toe portion and the length of the second leg in a forward direction being greater than the space between shoe laces, to prevent snagging, the second leg having rounded edges throughout its projecting extent, said edges defining a U-shaped locus which extends laterally from said junction, (c) whereby the motorcyclist's shoe is readily insertible between said second leg and peg and may then be displaced toward either the second leg or peg to rotate the crank member for effecting gear shifting.

2. The combination of claim 1 wherein said L-shaped bracket and said crank member are integral.

3. The combination of claim 1 wherein said L-shaped member has releasable connection to said crank member.

4. The combination of claim 1 wherein said peg has adjustable connection to said crank member characterized in that the peg may be adjustably shifted toward or away from said second leg.

5. The combination of claim 4 wherein the crank member includes a portion defining a slot elongated in the direction of separation of the peg and second leg, said peg including an extension projecting through the slot.

6. The combination of claim 1 wherein the peg includes an elastomeric outer sleeve.

7. The combination of claim 1 including motorcycle structure having a second peg to support an arch portion of the shoe, said first peg spaced forwardly of the second peg, the crank arm connected to the motorcycle transmission.

* * * * *